(12) United States Patent
Schmollgruber et al.

(10) Patent No.: US 12,470,690 B2
(45) Date of Patent: Nov. 11, 2025

(54) THERMALLY ROBUST CALIBRATION METHOD FOR STEREO CAMERAS UTILIZING PREDICTIVE MODELS

(71) Applicant: Stereolabs SAS, Montrouge (FR)

(72) Inventors: Cecile Schmollgruber, Boulogne (FR); Edwin Azzam, Antony (FR); Alexis Kedzia, Arcueil (FR); Olivier Braun, Vanves (FR)

(73) Assignee: Stereolabs SAS, Montrouge (FR)

( * ) Notice: Subject to any disclaimer, the term of this patent is extended or adjusted under 35 U.S.C. 154(b) by 0 days.

(21) Appl. No.: 19/090,907

(22) Filed: Mar. 26, 2025

(65) Prior Publication Data

US 2025/0337876 A1  Oct. 30, 2025

Related U.S. Application Data

(60) Provisional application No. 63/639,575, filed on Apr. 26, 2024.

(51) Int. Cl.
*H04N 17/00* (2006.01)
*H04N 13/246* (2018.01)

(52) U.S. Cl.
CPC ......... *H04N 17/002* (2013.01); *H04N 13/246* (2018.05)

(58) Field of Classification Search
CPC ........... G06T 7/80; G06T 7/85; H04N 13/246; H04N 1/6033
See application file for complete search history.

(56) References Cited

U.S. PATENT DOCUMENTS

| | | | |
|---|---|---|---|
| 9,813,692 B2 * | 11/2017 | Zabatani | G06F 3/017 |
| 10,742,877 B1 * | 8/2020 | Ning | H04N 25/61 |

(Continued)

FOREIGN PATENT DOCUMENTS

| | | |
|---|---|---|
| CN | 117676330 A | 3/2024 |
| EP | 4190266 A1 | 6/2023 |

OTHER PUBLICATIONS

Dean C. Merchant, Influence of Temperature on Focal Length for the Airborne Camera, Nov. 6-10, 2006, MAPPS/ASPRS Fall Conference, San Antonio, Texas, USA (Year: 2006).*

(Continued)

*Primary Examiner* — Jayanti K Patel
*Assistant Examiner* — Christopher Kingsbury Glover
(74) *Attorney, Agent, or Firm* — Daylight Law, P.C.

(57) ABSTRACT

This disclosure relates to the calibration and tuning of stereo cameras. A disclosed method includes measuring an operating temperature of a subject camera, applying the operating temperature to a subject camera function to produce an output, and tuning the subject camera at the operating temperature using the output. The subject camera functions can be derived using a calibration method. The calibration method can include obtaining reference camera measurement data at a set of temperatures and deriving a reference function for the reference camera using the data. The reference function uses temperature as an input. The calibration method can also include obtaining subject camera measurement data from the subject camera and deriving the subject camera function for the subject camera using the reference function for the reference camera and the subject camera measurement data.

28 Claims, 6 Drawing Sheets

Subject Camera Function Derivation 200

Reference and Subject Camera Functions Overlay 210

(56) References Cited

U.S. PATENT DOCUMENTS

| | | |
|---|---|---|
| 11,875,536 B1 | 1/2024 | Dokor et al. |
| 2019/0158813 A1 | 5/2019 | Rowell et al. |
| 2021/0327092 A1* | 10/2021 | Jiang .................. H04N 13/254 |
| 2021/0358148 A1* | 11/2021 | Mirbach .................. G06T 7/80 |

OTHER PUBLICATIONS

Henri Rebecq, et. al., ESIM: an Open Event Camera Simulator, 2018, 2nd Conference on Robot Learning, Zurich Switzerland (Year: 2018).*
OpenCV. "Camera Calibration and 3D Reconstruction." OpenCV, https://docs.opencv.org/4.x/d9/doc/group__calib3d.html.
OpenCV. "Camera Calibration with OpenCV." OpenCV, https://docs.opencv.org/4.x/dc/dbb/tutorial_py_calibration.html.
P. Podbreznik et al. (2012). Assessing the influence of temperature variations on the geometrical properties of a low-cost calibrated camera system by using computer vision procedures. Machine Vision and Applications, 23, 953-966.
H. Handel (2008). Compensation of thermal errors in vision based measurement systems using a system identification approach. 2008 9th International Conference on Signal Processing, 1329-1333.
International Search Report and Written Opinion dated Jul. 9, 2025 from International Application No. PCT/IB2025/054158, 11 pages.

* cited by examiner

FIG. 2
Subject Camera Function Derivation 200
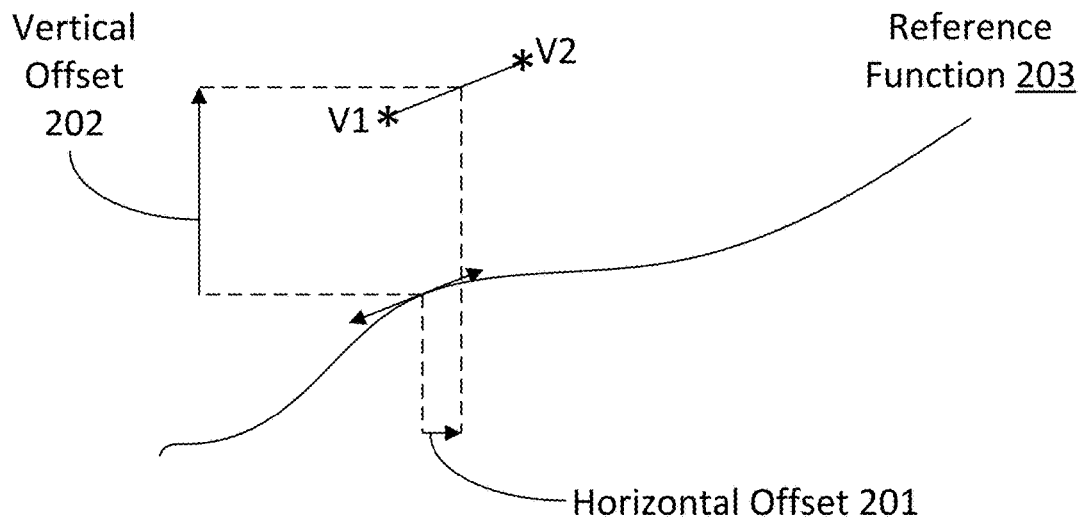
Reference and Subject Camera Functions Overlay 210
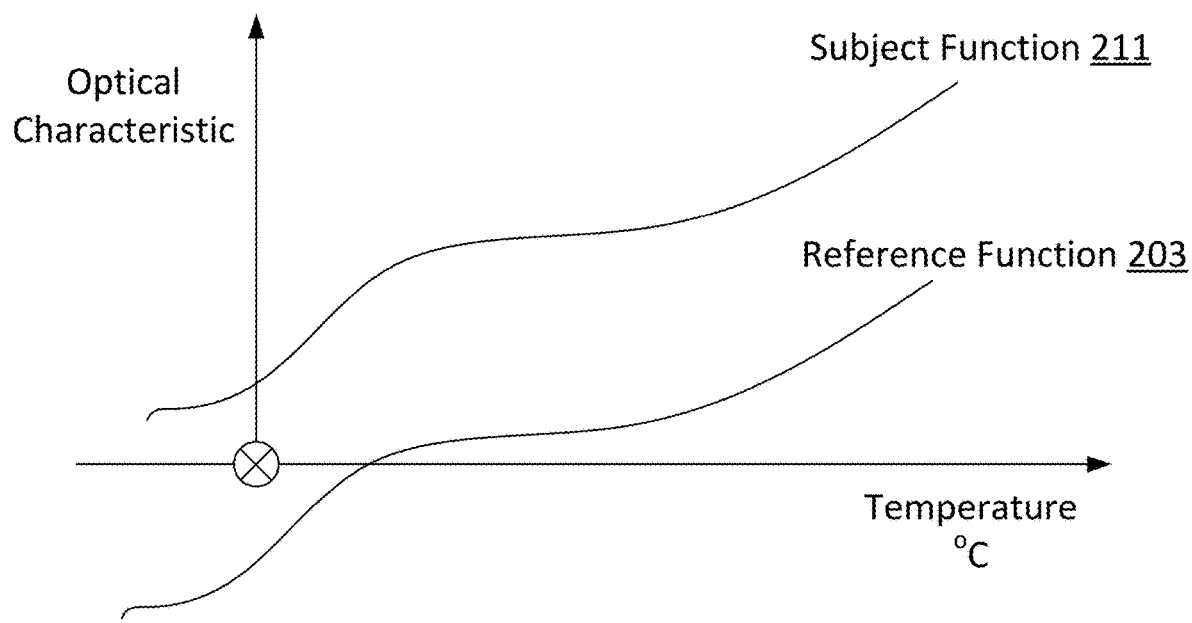

FIG. 3

$$h_\theta(T) = \theta_0 + \sum_{i=1}^{p} \theta_i T^i \qquad (EQ1)$$

$$h_\theta(T) = \theta^T \phi(T) \qquad (EQ2)$$

$$\theta = \begin{bmatrix} \theta_0 \\ \theta_1 \\ \theta_2 \\ \theta_3 \end{bmatrix} \quad \phi(T) = \begin{bmatrix} 1 \\ T \\ T^2 \\ T^3 \end{bmatrix} \quad \theta^T = \begin{bmatrix} \theta_0 & \theta_1 & \theta_2 & \theta_3 \end{bmatrix}$$

$$J(\theta) = \frac{1}{2} \sum_{i=1}^{n} \left( y_{(i)} - h_\theta(T_{(i)}) \right)^2 \qquad (EQ3)$$

$$\theta := \theta + \alpha \sum_{i=1}^{n} \left( y_{(i)} - h_\theta(T_{(i)}) \right) \phi(T_{(i)}) \qquad (EQ4)$$

$$h_{\theta,\varepsilon}(T) = \theta_0 + \varepsilon_0 + \sum_{i=1}^{p} \theta_i (T-\varepsilon_1)^i$$

$$H(\varepsilon) = \frac{1}{2} \sum_{i=1}^{k} \left( y_{(i)} - h_{\theta,\varepsilon}(T_{(i)}) \right)^2$$

FIG. 4

$$\frac{\delta H(\varepsilon)}{\delta \varepsilon_0} = \sum_{i=1}^{k} \left( y_{(i)} - h_{\theta,\varepsilon}(T_{(i)}) \right) \quad \text{(EQ7)}$$

$$\frac{\delta H(\varepsilon)}{\delta \varepsilon_1} = \sum_{i=1}^{k} \left( y_{(i)} - h_{\theta,\varepsilon}(T_{(i)}) \right) \frac{\delta h_{\theta,\varepsilon}(T_{(i)})}{\delta \varepsilon_1} \quad \text{(EQ8)}$$

$$\frac{\delta h_{\theta,\varepsilon}(T)}{\delta \varepsilon_1} = \sum_{i=1}^{p} -i\, \theta_i (T-\varepsilon_1)^{i-1} \quad \text{(EQ9)}$$

$$p=1 \quad \frac{\delta h_{\theta,\varepsilon}(T)}{\delta \varepsilon_1} = -\theta_1 \quad \text{(EQ10)}$$

$$p=2 \quad \frac{\delta h_{\theta,\varepsilon}(T)}{\delta \varepsilon_1} = -\theta_1 - 2\theta_2(T-\varepsilon_1) \quad \text{(EQ11)}$$

$$p=3 \quad \frac{\delta h_{\theta,\varepsilon}(T)}{\delta \varepsilon_1} = -\theta_1 - 2\theta_2(T-\varepsilon_1) - 3\theta_3(T-\varepsilon_1)^2 \quad \text{(EQ12)}$$

$$\varepsilon_0 := \varepsilon_0 + \gamma\, \frac{\delta H(\varepsilon)}{\delta \varepsilon_0} \quad \text{(EQ13)}$$

$$\varepsilon_1 := \varepsilon_1 + \gamma\, \frac{\delta H(\varepsilon)}{\delta \varepsilon_1}$$

FIG. 5
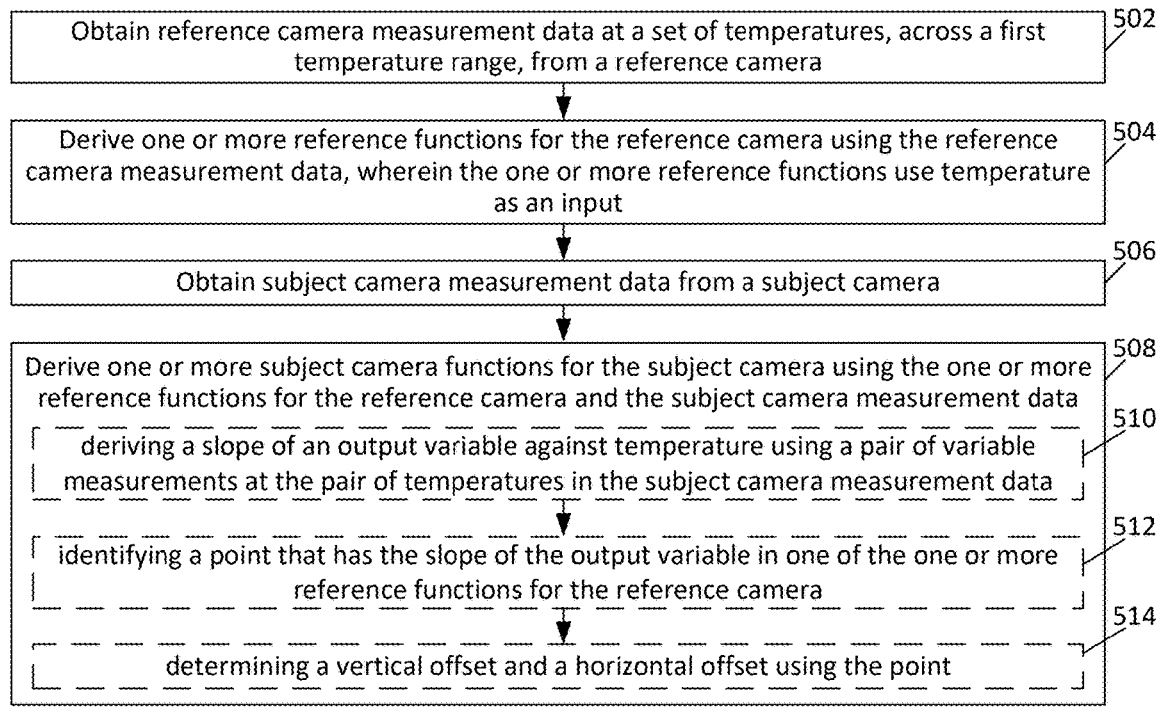
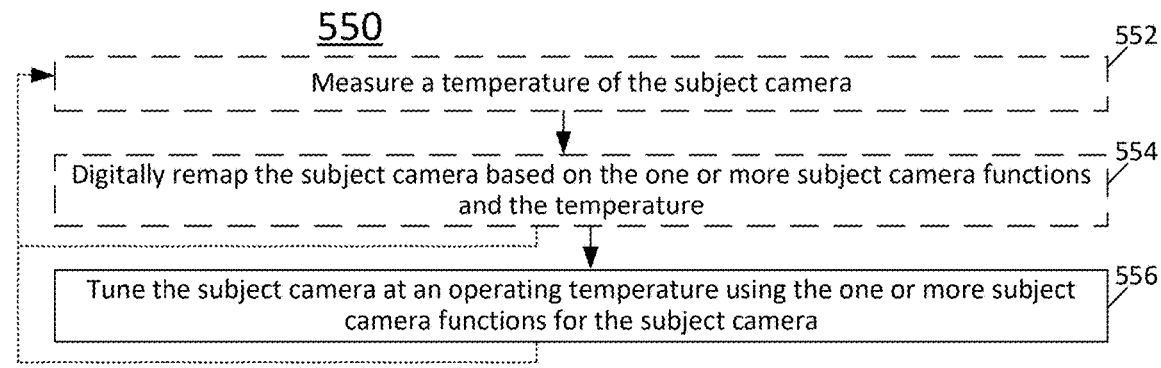
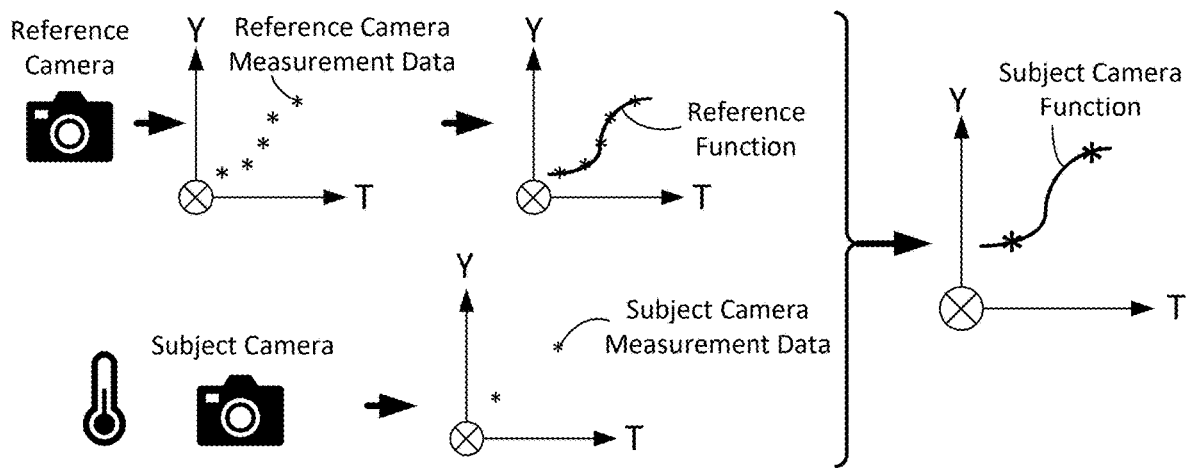

FIG. 6
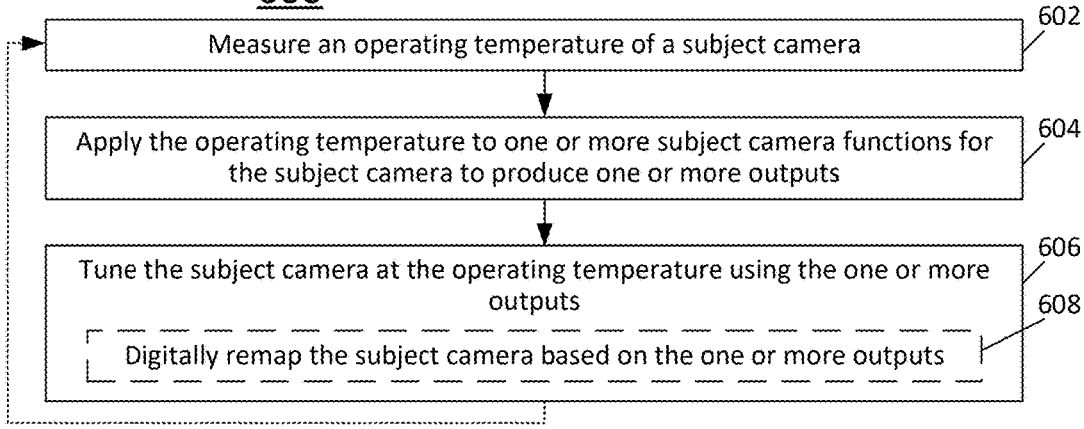
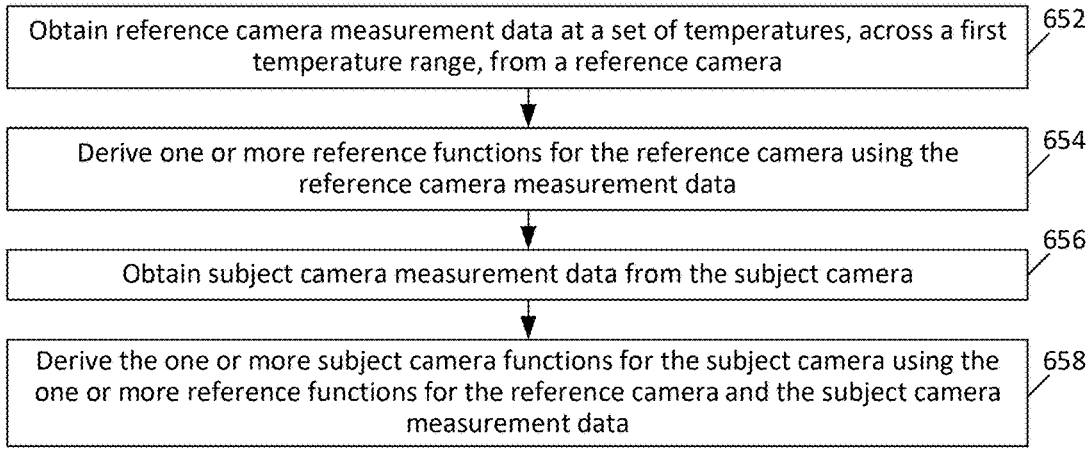
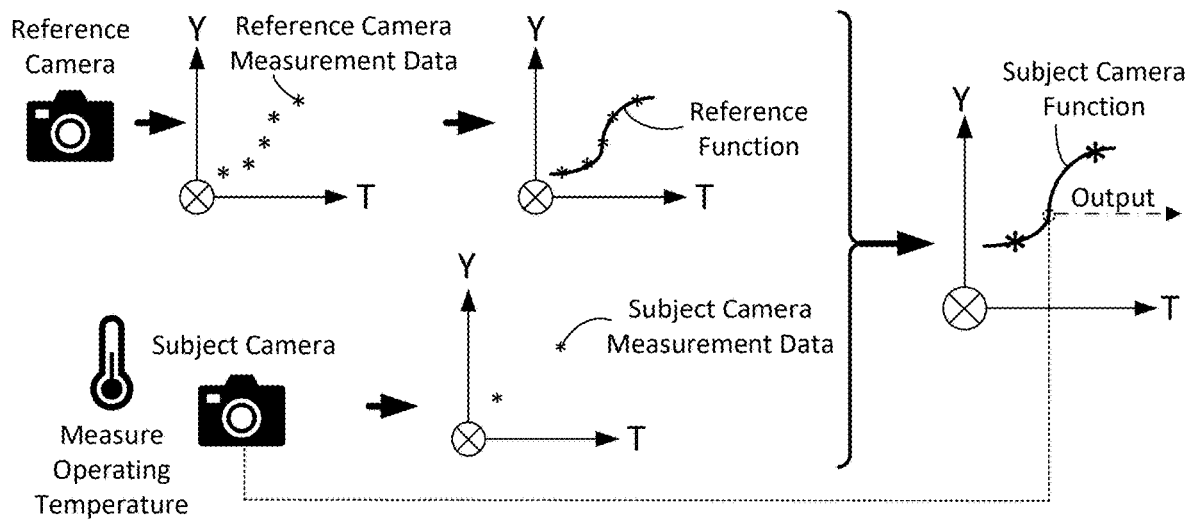

THERMALLY ROBUST CALIBRATION METHOD FOR STEREO CAMERAS UTILIZING PREDICTIVE MODELS

CROSS REFERENCE TO RELATED APPLICATIONS

This application claims the benefit of U.S. Prov. Pat. App. No. 63/639,575, filed Apr. 26, 2024, which is incorporated by reference herein in its entirety for all purposes.

BACKGROUND

The field of calibration of stereo imaging systems is a critical area in computer vision and photogrammetry that ensures the accuracy and reliability of depth perception and three-dimensional (3D) reconstruction from stereo images. Stereo imaging systems utilize a pair of cameras, positioned at slightly different angles, to mimic the binocular vision of the human eyes, thereby enabling the perception of depth through the analysis of disparities between the two captured images.

SUMMARY

This disclosure relates to calibration and tuning systems and methods for stereo cameras. Stereo cameras utilize imaging systems. A typical imaging system comprises an imaging sensor and a lens that needs to be properly aligned to the imaging sensor in order for the imaging system to produce a clear and visible image. Those components are subject to minimal changes from one imaging system to another and on the same imaging system when used in different conditions such as at different temperature levels. This results in changes to the optical characteristics of the imaging system from its ideal state. These optical characteristics include focal changes, optical center changes, and other characteristics. As stereo vision relies on the precise alignment and synchronization of two separate imaging systems to calculate depth information from the slight differences in the images captured by each camera, any discrepancy in that alignment, can lead to errors in depth estimation, resulting in inaccurate 3D representations of the scene.

The methods and systems disclosed herein include calibration methods in which a subject camera function is derived using a reference camera function and measurements taken by the subject camera. The methods and systems include tuning methods in which a subject camera is tuned to adjust for errors or discrepancies in the optical characteristics of the camera. The subject camera can be tuned in one of the disclosed tuning methods using a reference camera function which is derived using the disclosed calibration methods. Deriving the subject camera functions disclosed herein can be referred to as calibrating the subject camera. Adjusting the optical parameters of the subject camera in response to data derived from the subject camera function can be referred to as tuning the subject camera. Adjusting the optical parameters of the subject camera can include digitally remapping the subject camera.

The subject camera and the reference cameras disclosed herein can have different embodiments in different embodiments of the inventions disclosed herein. The subject camera can be a camera that is the "subject" of the methods disclosed herein (i.e., the goal of the methods directed to the subject camera is to improve the optical performance of the subject camera). The reference camera can be a virtual camera that is used as a reference to calibrate the subject camera. For example, the reference camera can exist only in an optical simulator which is used to generate a reference camera function for calibrating the subject camera. Alternatively, the reference camera can be a physical camera that is subjected to tests to derive a reference camera function therefrom for calibrating the subject camera. The subject camera and the reference camera can be different instantiations of a camera design (e.g., different physical products manufactured using the same production model). The instantiations can be physical or virtual (e.g., the reference camera can be a virtualized version of a physical camera and the subject camera can be the physical camera).

FIG. 1 illustrates a conceptual method flow diagram 100 in accordance with specific embodiments of the inventions disclosed herein. Flow diagram 100 includes both a calibration 110 of subject camera 111 and a tuning 120 of subject camera 111. Calibration 110 includes deriving a reference function 102 for reference camera 101 and obtaining subject camera measurement data 112 for subject camera 111. Calibration 110 also includes deriving a subject camera function 115 for the subject camera using the reference function 102 and the subject camera measurement data 112. Subject camera function 115 can then be used in tuning 120 of subject camera 111. For example, subject camera function 115 can be used to digitally remap subject camera 111 to improve the optical performance of subject camera 111. Various tuning approaches can be used in different embodiments to improve the performance of subject camera 111 in various ways.

As disclosed herein, in specific embodiments it is easier (e.g., in terms of time or testing requirements) to obtain subject camera data 112 as compared to the data required to obtain reference camera function 102 or to obtain subject camera function 115 without using reference camera function 102. As such, using approaches in accordance with flow diagram 100 the work used to product reference camera function 102 can be leveraged to more easily produce subject camera functions for multiple subject cameras than can then be used to tune the subject cameras. Each subject camera may store reference camera function 102 or may have access (e.g., via internet or a local area connection) to an external device that stores reference camera function 102.

In specific embodiments of the invention, a method is provided. The method comprises: obtaining reference camera measurement data at a set of temperatures, across a first temperature range, from a reference camera; and deriving one or more reference functions for the reference camera using the reference camera measurement data, wherein the one or more reference functions use temperature as an input. The method further comprises: obtaining subject camera measurement data from a subject camera; and deriving one or more subject camera functions for the subject camera using the one or more reference functions for the reference camera and the subject camera measurement data; wherein the subject camera is configured to conduct a tuning method, and the tuning method comprises tuning the subject camera at an operating temperature using the one or more subject camera functions for the subject camera.

In specific embodiments of the invention, a method is provided. The method comprises: measuring an operating temperature of a subject camera, applying the operating temperature to one or more subject camera functions for the subject camera to produce one or more outputs, and tuning the subject camera at the operating temperature using the one or more outputs, wherein the one or more subject camera functions are derived using a calibration method comprising: (i) obtaining reference camera measurement data at a set of temperatures, across a first temperature range, from a reference camera; (ii) deriving one or more reference functions for the reference camera using the reference camera measurement data, wherein the one or more reference functions use temperature as an input; (iii) obtaining subject camera measurement data from the subject camera; and (iv) deriving the one or more subject camera functions for the subject camera using the one or more reference functions for the reference camera and the subject camera measurement data.

In specific embodiments of the invention, a subject camera is provided. The subject camera comprises: an internal temperature sensor for measuring an operating temperature of the subject camera, one or more processors, and one or more non-transitory computer readable media storing instructions that, when executed by the one or more processors cause the subject camera to: (i) use the operating temperature to obtain one or more outputs from one or more subject camera functions; and (ii) tune the subject camera using the one or more outputs. The one or more subject camera functions are derived using a calibration method comprising: (i) obtaining reference camera measurement data at a set of temperatures, across a first temperature range, from a reference camera; (ii) deriving one or more reference functions for the reference camera using the reference camera measurement data; (iii) obtaining subject camera measurement data using the internal temperature sensor; and (iv) deriving the one or more subject camera functions for the subject camera using the one or more reference functions for the reference camera and the subject camera measurement data.

BRIEF DESCRIPTION OF THE DRAWINGS

The accompanying drawings illustrate various embodiments of systems, methods, and various other aspects of the disclosure. A person with ordinary skill in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2 illustrates the derivation of a subject camera function using a reference camera function and measurement data from a subject camera in accordance with specific embodiments of the inventions disclosed herein.

FIGS. 3 and 4 provide a set of equations for adapting reference camera functions and deriving subject camera functions in accordance with specific embodiments of the inventions disclosed herein.

FIG. 5 provides an example of a method for deriving one or more subject camera functions and an example of a tuning method in accordance with specific embodiments of the inventions disclosed herein.

FIG. 6 provides an example of a method for tuning the subject camera and an example of a calibration method in accordance with specific embodiments of the inventions disclosed herein.

DETAILED DESCRIPTION

Figure 1:
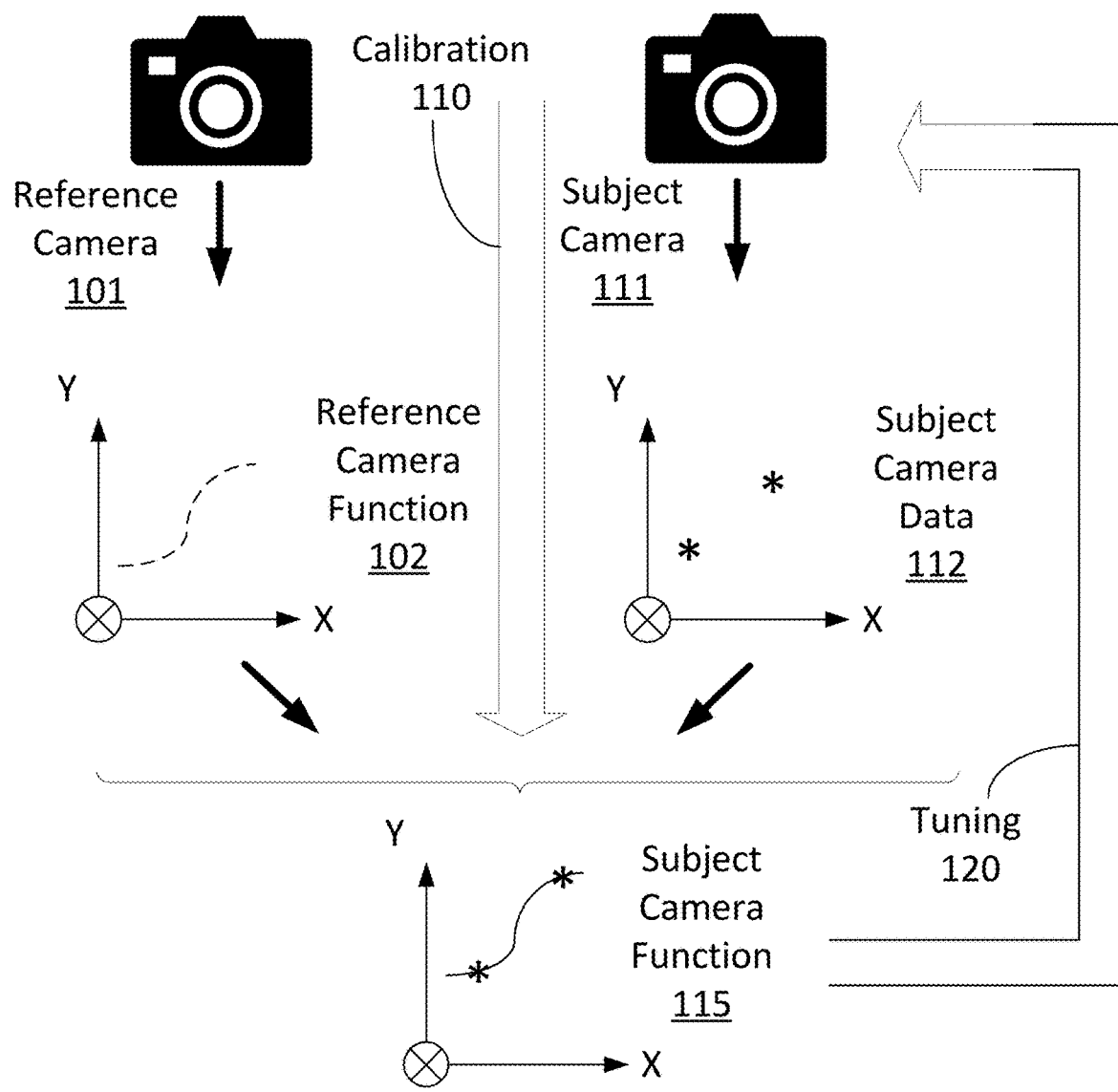
FIG. 1 provides a conceptual method flow diagram in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for calibration and tuning of stereo cameras are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

In specific embodiments of the invention, a calibration method for a subject camera is provided. The calibration method conducts measurements on a reference camera for purposes of deriving one or more reference camera functions that can be used to tune a subject camera. For example, in specific embodiments, the reference camera functions and measurement data from the subject camera are used to derive a subject camera function which can be used to tune the subject camera. The measurements conducted on the reference camera can be conducted at a manufacturing or testing facility in a temperature-controlled environment while the actual calibration of the subject camera can be conducted in an uncontrolled environment such as in the home or workplace where the subject camera is deployed. Alternatively, using the approaches disclosed herein, the measurements conducted on the reference camera can be conducted at a manufacturing or testing facility in a stringently temperature-controlled environment while the measurements on the subject camera are taken in a manufacturing or testing facility but with a less stringently controlled environment or through faster and thereby more efficient use of a stringently controlled environment.

In specific embodiments, a tuning method for a subject camera is provided. The tuning method can use a subject camera function derived using the calibration methods described above. The subject camera function can be used to tune the subject camera when the subject camera is deployed and in use. For example, the tuning can be applied periodically as the subject camera is in use (e.g., every time the subject camera takes a picture or every time a temperature measurement is made by an internal temperature sensor of the subject camera).

The reference camera and the subject camera can have various relationships. The subject camera can be a virtual camera instantiated in an optics simulator while the subject camera is a physical camera. Alternatively, the reference camera and the subject camera can be two physical instantiations of a camera design. Accordingly, the reference camera and the subject camera can have the same expected operating temperature range. Additionally, the subject camera function may be the same as or similar to the reference camera function. For example, the subject camera function may be the same as the reference camera function but with a y-offset where the y-offset is determined based on measurement data obtained from the subject camera.

The calibration method can involve performing a full temperature range calibration for a reference camera. In specific embodiments, the temperature range calibration can include obtaining reference camera measurement data at a set of controlled temperatures, across a first temperature range, from the reference camera in a temperature-controlled environment. The full temperature range calibration can be conducted in a temperature-controlled environment. The full temperature range calibration can be conducted across a first temperature range which includes the operating range of the reference camera.

In specific embodiments, the temperature range calibration can include obtaining synthetic reference camera measurement data, across a first temperature range, from a simulated reference camera. For example, a reference camera can be modeled and simulated in a virtual environment using optics simulation software, such as ray-tracing based simulation of the optical system, to obtain synthetic reference camera measurement data as the reference camera is simulated at different temperatures. The optics simulation software can simulate changes (e.g., dilations or contractions) of components of the reference camera (e.g., lens, support frame) to simulate changes of the shape of the optics and use that simulation to derive the synthetic reference camera measurement data.

In specific embodiments, the temperature range calibration can include obtaining synthetic reference camera measurement data, across a first temperature range, from a reference camera in a temperature-controlled environment. For example, a reference camera can be evaluated in a temperature-controlled environment, and data such as data regarding the state of the lens can be evaluated. The physically measured data can include changes (e.g., dilations or contractions) of components of the reference camera (e.g., lens, support frame) to measure changes of the shape of the optics and use that simulation to derive the synthetic reference camera measurement data. The data can then be used to derive synthetic reference camera measurement data such as a synthetic measurement of the focal length of the camera.

The calibration method can also involve determining one or more reference camera functions for the reference camera. The reference camera function or functions can comprise at least one optical characteristic as an output and temperature as an input. The optical characteristics can include focal length, camera orientations, camera positions, etc. The reference camera function or functions can comprise a transformation as an output and temperature as an input. For example, the output could be a "fundamental matrix" for a stereo camera system that is a transformation to be applied to an image captured by the stereo systems. As another example, in the case of a single camera, the reference camera function could be a scaling transformation. The scaling of the image is analogous to compensating changes in focal length, without explicitly outputting the focal length. The output of the reference camera function could be any image transformation, image translation vector, or 3D image rotation matrix. The reference camera function or functions can also take in additional inputs in addition to the temperature such as humidity, altitude, electromagnetic interference, and other exogenous parameters. In specific embodiments, the determining of the one or more reference camera functions for the reference camera can include deriving one or more reference camera functions for the reference camera using the reference camera measurement data that was obtained in the temperature-controlled environment. The one or more reference camera functions for the reference camera can take temperature as an input.

The calibration method can also involve performing a partial temperature range calibration, based on at least two measurements. The partial temperature range calibration can be conducted on a subject camera. In specific embodiments, the partial temperature range calibration includes obtaining subject camera measurement data at a pair of temperatures, across a temperature range, from the subject camera. The first temperature range, used to obtain the reference camera measurement data, can be broader than the second temperature range, used to obtain the subject camera measurement data. In specific embodiments, the measurements taken can measure the same variables or attributes when obtaining data from the reference camera and the subject camera. However, the data set obtained from the reference camera will be larger than the data set obtained from the subject camera because the reference camera is evaluated at more temperatures. In specific embodiments, the partial temperature range calibration can be based on a measurement when the camera is first powered-on (e.g., at 20° C.) and a second temperature when the camera is warmed up (e.g., at 25° C.). In specific embodiments of the invention, the subject camera may have an internal temperature sensor to detect the temperature of the camera when the measurements are taken. The same internal temperature sensor can be used when data is obtained from the subject camera, or a more accurate external temperature sensor associated with the temperature-controlled environment can be used instead. In specific embodiments, the first and second temperatures mentioned may be the pair of temperatures at which the subject camera measurement data is obtained.

The calibration method can also comprise extrapolating and/or interpolating the partial temperature range calibration of the subject camera based on the one or more reference camera functions of the reference camera across the temperature range of the full temperature range calibration (e.g. extrapolating and/or interpolating from the measurements at 20° C. and 25° C. for use between −20° C. to 50° C.). In specific embodiments, this step can include deriving one or more subject camera functions for the subject camera using the one or more reference camera functions for the reference camera and the subject camera measurement data.

The subject camera may have access to the one or more reference functions. For example, the one or more reference functions may be able to be stored on the subject camera. The reference functions may be stored in the memory of the subject camera as part of the manufacturing process of the subject camera, at a testing facility, or at another point before the subject camera is received by a customer. The subject camera may store the one or more reference functions and perform the calculations for digital remapping such that tuning can be done entirely on the subject camera. As another example, the one or more reference functions may be available to the subject camera via a network connection such as internet or a local area connection to an external device (or multiple external devices) that store the one or more reference functions. In specific embodiments, the external device may also perform some of the tuning work (e.g., calculations, comparisons, etc.) and send the results to the subject camera. Results may corresponding to the subject camera function in whole or in part. For example, the external device may provide the calculations for digitally remapping the subject camera and appropriate settings for the subject camera configurations to the subject camera.

The reference camera functions for the reference camera can be functions for the same output variables with temperature as an input as the subject camera functions for the subject camera. However, the functions will have a different relationship between temperature and the output variables based on the idiosyncrasies of the subject camera and the reference camera. However, the inventors have found that offsets which can be obtained through use of the subject camera measurement data described above and the reference functions for the reference camera described above can be used to reliably form an accurate subject camera function for the subject camera across the operating range of the subject camera.

In specific embodiments, the subject camera can be configured to engage in a tuning method using the subject camera functions for the subject camera. The tuning method can comprise tuning the subject camera at an operating temperature using the subject camera functions for the subject camera. The subject camera can be configured to conduct such a method in various ways. For example, the subject camera can store the subject camera functions for the subject camera locally to engage in the tuning method or it can include a network connection to an external server that stores the subject functions for the subject camera. As another example, the subject camera can store the reference functions for the reference camera locally to derive the subject camera functions locally, or it can include a network connection to an external server that stores the reference functions for the reference camera and either have the external server derive the subject camera functions or derive the subject camera functions locally. Furthermore, the subject camera can use an internal temperature sensor to detect a temperature and can then apply that temperature to the subject camera functions for the subject camera to determine a parameter such as focal length or some temperature induced distortion that can be cancelled out to tune the camera. The output of the subject camera function could be used to calculate the required tuning factor (e.g., focal length could be used to calculate a scaling factor which is used to tune the subject camera). Alternatively, the output of the subject camera function could be the required tuning factor (e.g., the subject camera function will output the scaling factor directly). The tuning can be conducted digitally, in analog, or using mixed signal tuning. The tuning can be a digital remapping which uses the subject camera function to calculate the values used in the digital remapping. The digital remapping can be applied to a digitization of an image captured by the camera to modify the image. The temperature can be within the operating range of the subject camera but outside the second temperature range at which the partial calibration was conducted. Using this approach, multiple subject cameras can have the benefit of a full temperature range calibration and tuning even though they were only individually calibrated with a partial temperature range calibration.

The tuning of the subject camera can be done during the operation of the subject camera. The process can include obtaining a temperature measurement, applying the temperature to the subject camera function, and tuning the subject camera based on the output of the subject camera function. For example, the tuning can be conducted every time the subject camera captures an image, periodically according to a fixed schedule, or every time the subject camera takes or receives a measurement of its temperature. The periodicity of the tuning can be based on a refresh rate of an internal temperature sensor of the subject camera. In specific embodiments, the temperature measurements which are used in the tuning can be smoothed with a sliding average window and the averaged temperature can be applied to the subject camera function.

The measurement of the subject camera measurement data and the calibration of the subject camera can take place numerous times. For example, the measurements can be conducted by the manufacturer or the first time the subject camera is powered on by a customer. The subject camera measurements can be conducted again if the camera is refurbished or goes through a maintenance cycle to compensate for age-related changes. The measurements and calibration can also be conducted periodically while the camera is in operation. The measurements can also be conducted over the course of the operational life of the subject camera as the internal temperature sensor determines that the camera is at a temperature it has never been in, or at a temperature it has not been in for a period of time that is long enough to make an additional measurement prudent. In specific embodiments, the measurement of the reference camera can be conducted before the subject camera is shipped to a customer and the measurement of the subject camera can be conducted after the subject camera is shipped to a customer. In an alternative embodiment, the measurement of the subject camera can be conducted before the camera is shipped to a customer and can be conducted as part of a final test and packaging process for the subject camera by the manufacturer.

In specific embodiments of the invention, a calibration process can include a full range calibration of one camera sample. The camera can be the reference camera mentioned above. The reference camera can be a fully assembled camera comprising a sensor and optical lenses. The reference camera can be placed in a climatic chamber where the temperature is controlled with a precision of 1° C. The temperature in the climatic chamber can range in the operating range of the camera, for instance −20° C. to +50° C. Measurements can be taken in an even spread across this temperature range. The full range of temperatures can be sampled with a step, for instance 5° C., based on the desired precision (−20° C., −15° C., −10° C. . . . 50° C.). At each temperature the reference camera can be analyzed, and reference camera measurement data can be obtained from the reference camera. The reference camera measurement data can include: (i) optical focal length; (ii) optical center; and (iii) distortion (5 to 8 parameters for radial, tangential, etc.). The calibration method can be applied to stereo or mono cameras. In the case of stereo cameras, additional measurement data can include rotation and translation between the pair of imagers that form the stereo camera. In these instances, the analysis can include using checkerboards or other visual reference patterns that can be matched between a left and right camera or a stereo camera.

In specific embodiments, one or more camera functions are derived for the subject camera and reference camera to produce one or more subject camera functions and one or more reference camera functions. The one or more subject camera functions can be optical characteristic functions that are derived from the measurements of the reference camera and subject camera. The optical characteristic functions can include: (i) a focal length function; (ii) a distortion tuning function; (iii) an alignment adjustment function; (iv) an imaging quality function; (v) an optical distortion function;

and (vi) an optical zoom function. Each optical characteristic function can be temperature dependent. In other words, each optical characteristic function can use temperature as an input parameter. The optical characteristic functions can include other input parameters in addition to temperature. Each optical characteristic function will output at least one optical characteristic. In other words, each optical characteristic function has at least one output parameter which is an optical characteristic of the camera.

The optical characteristics can be encoded by a number or a vector. The optical characteristic can be: a focal length number for a focal length function; a distortion vector for a distortion tuning function; a translation vector for an alignment adjustment function, or any other optical characteristic of a camera. Accordingly, the one or more subject camera functions can be used to generate a distortion vector or a translation vector, and the calibrating of the subject camera can involve inputting that value into a distortion tuning function or alignment adjustment function to calibrate the subject camera. An exemplary distortion vector can be as described in the OpenCV standard with 5 dimensions (i.e., 3 radial dimensions k1, k2, and k3 for the radial distortion and 2 dimensions p1 and p2 for the tangential distortion). Distortion vectors with higher dimensions can also be used with anywhere from 4 to 14 dimensions.

In embodiments in which the subject camera functions and reference camera functions are optical characteristic functions, each optical characteristic function can be determined by performing a regression analysis based on the input parameters (e.g., temperature) to best fit an output parameter (e.g., optical focal length) derived from the measurements performed during the analysis of the reference camera. In these embodiments, the controlled temperature in which the analysis of the reference camera is conducted can be the input temperature and the measurement data from the reference camera can be used in a best fit analysis to derive the one or more subject camera functions for the subject camera. The regression analysis can be a linear regression analysis or a polynomial regression analysis (degree 2 or above). The method to determine an optical characteristic function can be generalized to other computational techniques such as machine learning, outputting a vector for all parameters of interest by adjusting (learning) coefficients of the machine learning model.

Once the reference camera has been characterized using the approach described above, there will be one or more reference camera functions (e.g., optical characteristic functions) for a reference camera. Each of the one or more reference camera functions can then be used as a reference function for a plurality of camera samples as explained below in more detail below.

In real world production, each camera that is produced by a manufacturing line is different even when they are different physical instantiations of the same camera design. As such, the optical characteristics of a particular camera sample won't be identical, for a given temperature, to the optical characteristics of the reference camera. However, it has been observed that the shape of an optical characteristic as a function of the temperature is fairly consistent for a given camera design. Specific embodiments of the processes disclosed herein leverage this remarkable property by adapting the reference function to physical instantiations of the same camera design (e.g., two "Z2X" model cameras produced on two different days from the same assembly line). More specifically, specific approaches disclosed herein include the determination of offsets (vertical or/and horizontal) for each reference function to create a subject camera function for specific cameras.

FIG. 2 illustrates the derivation of a subject camera function using a reference camera function and measurement data from a subject camera in accordance with specific embodiments of the inventions disclosed herein. In the illustrated case, the subject camera function and the reference camera function are both optical characteristic functions with the input of the function being temperature and the output being the value for the optical characteristic. In derivation 200, a reference camera function 203 is available, having been previously derived from measurements on a physical or virtual reference camera. As such, for each new camera, a calibration of the new camera can be done using measurements taken at two temperatures across a limited range instead of many measurements at a large number of temperatures across a full range of temperatures. This reduces the calibration costs by limiting the number of measurements per camera sample.

Derivation 200 in FIG. 2 also includes two samples of measurement data taken for a subject camera at two different temperatures. An analysis of the new camera sample provides set of data points V1 and V2, where each data point comprises an input value (temperature) and an output value (e.g., an optical characteristic of the subject camera at that temperature). For example, V1=(20° C.; 36 mm) and V2=(25° C.; 36.5 mm) where 36 mm and 36.5 mm are the focal length for the subject camera at those two temperatures. For each pair of temperatures applied to the camera, it is possible to derive two offsets (vertical and horizontal) to fit the curve of the corresponding reference camera function relating to the same optical characteristic as the data points. For instance, the slope (i.e. local derivative) can be used to determine a horizontal offset 201 by finding the closest point on the reference function that expresses that slope and the average value of the optical characteristic can be used to determine a vertical offset 202 by comparing that average value to the value at the closest point on the reference function that expressed the slope. As shown in overlay 210, the subject function 211 can thereafter be derived as the reference function 203 offset by horizontal offset 201 and vertical offset 202.

In specific embodiments, there is an adaptation of the reference camera function by searching to the closest linear portion in the reference camera function to adjust the polynomial coefficient to be applied to an extrapolated/interpolated function. More generally, there is an adaptation of the reference camera function by adjusting the reference camera function with additional parameters where the additional parameters offset the reference camera function horizontally and/or vertically.

FIGS. 3 and 4 provide a set of equations for adapting reference camera functions and deriving subject camera functions in accordance with specific embodiments of the inventions disclosed herein. For example, if the reference camera function is a polynomial function of degree p, where p typically ranges from 1 (linear function) to 3 (polynomial function of degree 3), the reference camera function can be written in the form shown in equation EQ1, having a first set of model parameters $\theta_0, \theta_1, \ldots \theta_p$. The reference camera function can be expressed as a linear or nonlinear function (exponential, polynomial . . . ) of input parameters including the temperature (T) and other input parameters such as the humidity.

In specific embodiments, the reference camera function can be expressed as a linear function of a transformed input dataset ø(T) as shown in equation EQ2. In the example of a polynomial function of degree 3, the transformed input dataset would replace the temperature T by a features vector of 4 dimensions 1, T, $T^2$ and $T^3$.

In specific embodiments, the reference camera function is determined by taking n measurements y(1), y(2), ... y(n) of a reference camera at different temperatures T(1), T(2), ... T(n). The camera measurement data includes n samples (T(i), y(i)) where i ranges from 1 to n.

As such, the reference camera function can be determined by linear regression on the reference camera measurement data using a gradient descent algorithm with a cost function shown in equation EQ3. The gradient descent algorithm can include a loop that updates the first set of model parameters θ as shown in equation EQ4, where the first set of model parameters is expressed in vector form. It is understood that other computational methods can be used to determine the first set of model parameters, such a kernel-based method if the number of parameters is large, thereby reducing the computational load.

The number of camera measurement data n can range from 10 to 100, for example by taking measurements in an operating range from −20° C. to +50° C. with a 5° C. step. As in certain embodiments it would be cost prohibitive to measure n data points for every camera, using the reference camera functions disclosed herein to derive subject camera functions for other cameras can produce significant benefits.

In specific embodiments, a subject camera function is derived from the reference camera function and subject camera measurement data for each subject camera. The subject camera function can be expressed using the first set of model parameters and additional offset parameters ε. The second set of model parameters ε provides variations to the first model parameters. For example, the variations could be a vertical offset $\varepsilon_0$ and a horizontal offset $\varepsilon_1$. It is understood that more offsets can be included if there are more input parameters (e.g., temperature and humidity).

In specific embodiments, the subject camera function can be written in the form shown in equation EQ5, with the first set of model parameters θ being derived from the reference camera measurement data, and a second set of model parameters ε derived from subject camera measurement data.

In specific embodiments, the subject camera measurement data can include k measurements y(1), y(2), ... y(k) of the subject camera at different temperatures T(1), T(2), ... T(k). The subject camera measurement data includes k samples (T(i), y(i)) where i ranges from 1 to k. Typically, k is a number close to, equal, or higher than the number of parameters in the second set of model parameters. The number k is smaller than the number n, providing a benefit in terms of measurement costs. Typically, k is 2 or 3, meaning two or three measurements are done for each subject camera.

In specific embodiments, the subject camera function can be determined by linear regression on the subject camera measurement data using a gradient descent algorithm with a cost function H(ε) as shown in equation EQ6. The gradient descent algorithm can include a loop that updates the second set of model parameters ε as shown in equation EQ13 for $\varepsilon_0$, and in equation EQ14 for $\varepsilon_1$. It is important to note that the first set of model parameters θ is not updated itself, but only the second set E. The gradient descent algorithm can be based on partial derivatives of the cost function H(ε), the partial derivative being shown in equations EQ7, EQ8 with EQ9, EQ10, EQ11 and EQ12.

In specific embodiments of the invention, the subject camera can include hardware and software to allow the subject camera to conduct the calibration or tuning processes described herein. For example, the subject camera could include the ability to take the data measurements disclosed herein and parameters that represent the reference camera functions disclosed herein and use them to derive the subject camera function disclosed herein. For example, the first set of model parameters disclosed herein can be hard coded on the subject camera, and the second set of model parameters can be saved in memory when the subject camera is calibrated. The second set of model parameters can then be recalled from memory and used to turn the subject camera when needed.

In preferred embodiments, the reference functions include: a reference function outputting a focal length, the function being a polynomial function of degree 3; a reference function outputting an optical center, the function being a linear function; a reference function outputting a distortion, the function being a linear function; and/or a reference function outputting rotations, the function being a polynomial function of degree 2.

In specific embodiments, only a single measurement is required of the subject camera. In these approaches, the step of deriving the subject camera functions for the subject camera could involve calculating a single vertical or a single horizontal offset between the measured point and the reference function for the reference camera. Alternatively, the step could involve calculating the minimum root mean squared sum of vertical and horizontal offsets between the measured point and the reference function for the reference camera.

In specific embodiments, two measurements are taken, as described above, and are used in a slope fitting procedure which analyzes and aligns a local slope of the subject camera function for the subject camera with the slope derived from the measurements on the subject camera. The process of using two measurements can improve the fitting and limit errors caused by noise. In specific embodiments, further measurements are taken. The measurements can be taken opportunistically as the temperature of the camera changes according to ambient conditions. Alternatively, the subject camera can be placed in a temperature-controlled environment and additional measurements can be taken. These embodiments could still exhibit beneficial approaches in which a full calibration is performed for each individual camera because the camera would need to occupy the temperature-controlled environment for less time. These approaches would also exhibit higher precision as the fitting between the reference functions of the reference camera and the subject camera functions of the subject camera would be considerably improved.

FIG. 5 provides an example of method 500 for deriving one or more subject camera functions and tuning method 550 in accordance with specific embodiments of the inventions disclosed herein. Method 500 may be implemented by a system including an internal temperature sensor, one or more processors, and one or more non-transitory computer readable media. In specific embodiments, the system may also include control circuitry, a reference camera, and a subject camera. In specific embodiments, the subject camera and the reference camera may be different physical instantiations of a camera design. Method 500 may be implemented by a system including means for performing the steps of method 500. Tuning method 550 may be implemented by a system including means for performing the steps of tuning method 550. Steps, or portions of steps, of method 500 and tuning method 550 may be duplicated, omitted, rearranged, or otherwise deviate from the form shown. For example, in specific embodiments, the measuring of the temperature of the subject camera and digitally remapping steps (e.g., steps 552 and 554) may be periodically repeated during operation of the subject camera. Additional steps may be added to method 500 and tuning method 550. Steps, or portions of steps, of method 500 and tuning method 550 may be performed in series or parallel.

At step 502, reference camera measurement data may be obtained. The reference camera measurement data may be obtained at a set of temperature across a first temperature range. The reference camera measurement data may be obtained from a reference camera. In specific embodiments, the set of temperatures may be a set of controlled temperatures and the obtaining of the reference camera measurement data may be conducted in a temperature-controlled environment. In specific embodiments, the reference camera measurement data may be synthetic reference camera measurement data and the reference camera measurement data may be at least partly derived using an optics simulator. In specific embodiments, the set of temperatures may be a set of controlled temperatures and the set of controlled temperatures may have a cardinality of greater than two. In specific embodiments, the set of temperatures may be a set of controlled temperatures, the first temperature range may include an operating range of the reference camera, and the set of controlled temperatures may be evenly spaced across the operating range of the reference camera.

At step 504, one or more reference functions for the reference camera may be derived using the reference camera measurement data (e.g., obtained at step 502). The one or more reference functions may use temperature as an input. In specific embodiments, the one or more reference functions for the reference camera may include at least one of: a focal length function, a distortion tuning function, an alignment adjustment function, an imaging quality function, an optical distortion function, and an optical zoom function.

The subject camera may have access to the one or more reference functions. For example, the one or more reference functions may be able to be stored on the subject camera or the one or more reference functions may be available via a network connection. The subject camera may have access to the one or more reference functions so that tuning (e.g., tuning method 550) can be done either entirely on the subject camera or with the help of an internet connection or local area connection to an off-system with the one or more reference functions. The off-system may also perform some of the tuning work (e.g., calculations, comparisons, etc.).

At step 506, subject camera measurement data may be obtained from a subject camera. In specific embodiments, the subject camera measurement data may be obtained at a pair of temperatures, across a second temperature range, from the subject camera. In specific embodiments, the first temperature range (e.g., of step 502) may be broader than the second temperature range. In specific embodiments, the subject camera and the reference camera may be different physical instantiations of a camera design. In specific embodiments, the obtaining of the subject camera measurement data may be conducted when the subject camera is powered on and the pair of temperatures may be a temperature when the subject camera is turned on and a temperature when the subject camera has warmed up to an operating temperature. In specific embodiments, the obtaining of the subject camera measurement data may be conducted in an uncontrolled environment.

At step 508, one or more subject camera functions for the subject camera may be derived using the one or more reference functions for the reference camera (e.g., derived at step 504) and the subject camera measurement data (e.g., obtained at step 506). In specific embodiments, the deriving of the one or more subject camera functions for the subject camera may be conducted before the subject camera is shipped to a customer. In specific embodiments, the subject camera is configured to conduct a tuning method (such as tuning method 550), and the tuning method comprises tuning the subject camera at an operating temperature using the one or more subject camera functions for the subject camera.

In specific embodiments and as part of deriving the one or more subject camera functions for the subject camera using the one or more reference functions for the reference camera, at step 510, a slope of an output variable may be derived against temperature using a pair of variable measurements at the pair of temperatures in the subject camera measurement data.

In specific embodiments and as part of deriving the one or more subject camera functions for the subject camera using the one or more reference functions for the reference camera, at step 512, a point that has the slope of the output variable may be identified in one of the one or more reference functions for the reference camera.

In specific embodiments and as part of deriving the one or more subject camera functions for the subject camera using the one or more reference functions for the reference camera, at step 514, a vertical offset and a horizontal offset may be determined using the point (e.g., identified at step 512).

The subject camera may be configured to conduct tuning method 550. In specific embodiments, at step 552, a temperature of the subject camera may be measured. In specific embodiments, the measuring of the temperature of the subject camera step may be periodically repeated during operation of the subject camera. In specific embodiments, control circuitry may be configured to repeat the measurement of the temperature of the subject camera step during operation of the subject camera. In specific embodiments, the subject camera may be configured to repeat the measuring of the temperature of the subject camera step upon a command input to the subject camera. In specific embodiments, the subject camera may be configured to repeat the measuring of the temperature of the subject camera step when the internal temperature sensor indicates a change to the operating temperature.

In specific embodiments, at step 554, the subject camera may be digitally remapped based on the one or more subject camera functions and the temperature. In specific embodiments, the digitally remapping step may be periodically repeated during operation of the subject camera. In specific embodiments, the subject camera (e.g., control circuitry thereof) may be configured to repeat the digitally remapping step upon a command input to the subject camera. In specific embodiments, the digitally remapping step may be based on the temperature and a sliding average of temperatures measured in prior iterations of the measuring the temperature of the subject camera step (e.g., step 552).

At step 556, the subject camera may be tuned at an operating temperature using the one or more subject camera functions for the subject camera (e.g., derived at step 508 of method 500). In specific embodiments, the tuning of the subject camera at the operating temperature may be conducted after the subject camera is shipped to the customer.

FIG. 6 provides an example of method 600 for tuning the subject camera and calibration method 650 in accordance with specific embodiments of the inventions disclosed herein. Method 600 may be implemented by a system including an internal temperature sensor, one or more processors, and one or more non-transitory computer readable media. In specific embodiments, the system may also include control circuitry, a reference camera, and a subject camera. In specific embodiments, the subject camera and the reference camera may be different physical instantiations of a camera design. Method 600 may be implemented by a system including means for performing the steps of method 600. Calibration method 650 may be implemented by a system including means for performing the steps of calibration method 650. Steps, or portions of steps, of method 600 and calibration method 650 may be duplicated, omitted, rearranged, or otherwise deviate from the form shown. For example, in specific embodiments, the measuring of the temperature of the subject camera and tuning steps (e.g., steps 602 and 606) may be periodically repeated during operation of the subject camera. Additional steps may be added to method 600 and calibration method 650. Steps, or portions of steps, of method 600 and calibration method 650 may be performed in series or parallel.

At step 602, an operating temperature of a subject camera may be measured. In specific embodiments, the measuring of the temperature of the subject camera step may be periodically repeated during operation of the subject camera. In specific embodiments, control circuitry may be configured to repeat the measurement of the temperature of the subject camera step during operation of the subject camera. In specific embodiments, the subject camera may be configured to repeat the measuring of the temperature of the subject camera step upon a command input to the subject camera. In specific embodiments, the subject camera may be configured to repeat the measuring of the temperature of the subject camera step when the internal temperature sensor indicates a change to the operating temperature. In specific embodiments, the measuring of the subject camera operating temperature may be conducted in an uncontrolled environment.

At step 604, the operating temperature may be applied to one or more subject camera functions for the subject camera to produce one or more outputs.

At step 606, the subject camera may be tuned at the operating temperature using the one or more outputs (e.g., produced at step 604). In specific embodiments, the tuning step may be periodically repeated during operation of the subject camera. In specific embodiments, control circuitry may be configured to repeat the tuning step during operation of the subject camera. In specific embodiments, the subject camera may be configured to repeat the tuning step upon a command input to the subject camera. In specific embodiments, the subject camera may be configured to repeat the tuning step when the internal temperature sensor indicates a change to the operating temperature. The one or more subject camera functions may be derived using a calibration method (such as calibration method 650). In specific embodiments, the tuning of the subject camera at the operating temperature may be conducted after the subject camera is shipped to the customer.

In specific embodiments and as part of tuning the subject camera, at step 608, the subject camera may be digitally remapped based on the one or more outputs (e.g., produced at step 604). In specific embodiments, the digitally remapping step may be based on the operating temperature and a sliding average of temperatures measured in prior iterations of the measuring the temperature of the subject camera step (e.g., step 602).

The one or more subject camera functions may be derived using calibration method 650. At step 652, reference camera measurement data may be obtained at a set of temperatures, across a first temperature range, from a reference camera. In specific embodiments, the first temperature range may include an operating range of the reference camera and the set of temperatures may be evenly spaced across the operating range of the reference camera. In specific embodiments, the subject camera and the reference camera may be different physical instantiations of a camera design.

At step 654, one or more reference functions may be derived for the reference camera using the reference camera measurement data. The one or more reference functions may use temperature as an input. The subject camera may have access to the one or more reference functions. For example, the one or more reference functions may be able to be stored on the subject camera or the one or more reference functions may be available via a network connection. The subject camera may have access to the one or more reference functions so that tuning (e.g., method 600) can be done either entirely on the subject camera or with the help of an internet connection or local area connection to an off-system with the one or more reference functions. The off-system may also perform some of the tuning work (e.g., calculations, comparisons, etc.).

At step 656, subject camera measurement data may be obtained from the subject camera. In specific embodiments, the obtaining of the subject camera measurement data may be conducted upon the subject camera being powered on. In specific embodiments, the subject camera measurement data may include a temperature of the subject camera when the subject camera is turned on and a second temperature of the subject camera when the subject camera has warmed up.

At step 658, the one or more subject camera functions for the subject camera may be derived using the one or more reference functions for the reference camera (e.g., derived at step 654) and the subject camera measurement data (e.g., obtained at step 656). In specific embodiments, the deriving of the one or more subject camera functions for the subject camera may be conducted before the subject camera is shipped to a customer.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. For example, while the example of a single subject camera and reference camera has been used herein, the disclosure is broadly applicable to mono or stereo cameras which include multiple image sensors. Furthermore, while the term camera has been used extensively herein, the disclosure is broadly applicable to any imaging system with temperature dependent capture characteristics. These and other modifications and variations to the present invention may be practiced by those skilled in the art, without departing from the scope of the present invention, which is more particularly set forth in the appended claims.

What is claimed is:

1. A method comprising:
    obtaining reference camera measurement data at a set of temperatures, across a first temperature range, from a reference camera;

deriving one or more reference functions for the reference camera using the reference camera measurement data, wherein the one or more reference functions use temperature as an input;

obtaining subject camera measurement data from a subject camera; and deriving one or more subject camera functions for the subject camera using the one or more reference functions for the reference camera and the subject camera measurement data;

wherein the subject camera measurement data is obtained at a pair of temperatures, across a second temperature range, from the subject camera;

wherein the deriving of the one or more subject camera functions for the subject camera using the reference camera comprises: (i) deriving a slope of an output variable against temperature using a pair of variable measurements at the pair of temperatures in the subject camera measurement data; (ii) identifying a point that has the slope of the output variable in one of the one or more reference functions for the reference camera; and (iii) determining a vertical offset and a horizontal offset using the point; and wherein the subject camera is configured to conduct a tuning method, and the tuning method comprises tuning the subject camera at an operating temperature using the one or more subject camera functions for the subject camera.

2. The method of claim 1, wherein:
the set of temperatures are a set of controlled temperatures; and
the obtaining of the reference camera measurement data is conducted in a temperature-controlled environment.

3. The method of claim 1, wherein:
the reference camera measurement data is synthetic reference camera measurement data; and
the reference camera measurement data is at least partly derived using an optics simulator.

4. The method of claim 1, wherein:
the set of temperatures are a set of controlled temperatures; and
the set of controlled temperatures has a cardinality of greater than two.

5. The method of claim 1, wherein:
the first temperature range is broader than the second temperature range.

6. The method of claim 1, wherein:
the tuning method further comprises measuring a temperature of the subject camera; and
the tuning further comprises digitally remapping the subject camera based on the one or more subject camera functions and the temperature.

7. The method of claim 6, wherein the tuning method further comprises:
periodically repeating the measuring of the temperature of the subject camera and digitally remapping steps during operation of the subject camera;
wherein the digitally remapping step is based on the temperature and a sliding average of temperatures measured in prior iterations of the measuring the temperature of the subject camera step.

8. The method of claim 1, wherein:
the set of temperatures are a set of controlled temperatures;
the first temperature range includes an operating range of the reference camera; and
the set of controlled temperatures are evenly spaced across the operating range of the reference camera.

9. The method of claim 1, wherein:
the subject camera and the reference camera are different physical instantiations of a camera design.

10. The method of claim 1, wherein:
the one or more reference functions for the reference camera include at least one of: a focal length function, a distortion tuning function, an alignment adjustment function, an imaging quality function, an optical distortion function, and an optical zoom function.

11. The method of claim 1, wherein:
the obtaining of the subject camera measurement data is conducted when the subject camera is powered on; and
the pair of temperatures are a temperature when the subject camera is turned on and a temperature when the subject camera has warmed up to an operating temperature.

12. The method of claim 1, wherein:
the deriving of the one or more subject camera functions for the subject camera is conducted before the subject camera is shipped to a customer; and
the tuning of the subject camera at the operating temperature is conducted after the subject camera is shipped to the customer.

13. The method of claim 1, wherein:
the obtaining of the subject camera measurement data is conducted in an uncontrolled environment.

14. A method comprising:
measuring an operating temperature of a subject camera;
applying the operating temperature to one or more subject camera functions for the subject camera to produce one or more outputs, wherein the one or more subject camera functions are at least one of: a focal length function, a distortion tuning function, an alignment adjustment function, an imaging quality function, an optical distortion function, and an optical zoom function; and
tuning the subject camera at the operating temperature using the one or more outputs;
wherein the one or more subject camera functions are derived using a calibration method comprising: (i) obtaining reference camera measurement data at a set of temperatures, across a first temperature range, from a reference camera; (ii) deriving one or more reference functions for the reference camera using the reference camera measurement data, wherein the one or more reference functions use temperature as an input, and wherein the one or more reference functions are at least one of: a focal length function, a distortion tuning function, an alignment adjustment function, an imaging quality function, an optical distortion function, and an optical zoom function; (iii) obtaining subject camera measurement data from the subject camera at a set of at least two temperatures, wherein the subject camera measurement data includes optical characteristic data for the subject camera at the set of at least two temperatures; and (iv) deriving the one or more subject camera functions for the subject camera using the one or more reference functions for the reference camera and the subject camera measurement data from the set of at least two temperatures.

15. The method of claim 14, wherein tuning the subject camera comprises:
digitally remapping the subject camera based on the one or more outputs.

16. The method of claim 15, further comprising:
periodically repeating the measuring of the temperature of the subject camera and tuning steps during operation of the subject camera;
wherein the digitally remapping is based on the operating temperature and a sliding average of temperatures measured in prior iterations of the measuring the temperature of the subject camera step.

17. The method of claim 14, wherein:
the first temperature range includes an operating range of the reference camera; and
the set of temperatures are evenly spaced across the operating range of the reference camera.

18. The method of claim 14, wherein:
the subject camera and the reference camera are different physical instantiations of a camera design.

19. The method of claim 14, wherein:
the obtaining of the subject camera measurement data is conducted upon the subject camera being powered on.

20. The method of claim 14, wherein:
the deriving of the one or more subject camera functions for the subject camera is conducted before the subject camera is shipped to a customer; and
the tuning of the subject camera at the operating temperature is conducted after the subject camera is shipped to the customer.

21. The method of claim 14, wherein:
the measuring of the subject camera operating temperature is conducted in an uncontrolled environment.

22. A subject camera comprising:
an internal temperature sensor for measuring an operating temperature of the subject camera;
one or more processors; and
one or more non-transitory computer readable media storing instructions that, when executed by the one or more processors cause the subject camera to: (i) use the operating temperature to obtain one or more outputs from one or more subject camera functions; and (ii) tune the subject camera using the one or more outputs;
wherein the one or more subject camera functions are derived using a calibration method comprising: (i) obtaining reference camera measurement data at a set of temperatures, across a first temperature range, from a reference camera; (ii) deriving one or more reference functions for the reference camera using the reference camera measurement data, wherein the one or more reference camera functions are at least one of: a focal length function, a distortion tuning function, an alignment adjustment function, an imaging quality function, an optical distortion function, and an optical zoom function; (iii) obtaining subject camera measurement data using the internal temperature sensor at a set of at least two temperatures, wherein the subject camera measurement data includes optical characteristic data for the subject camera; and (iv) deriving the one or more subject camera functions for the subject camera using the one or more reference functions for the reference camera and the subject camera measurement data from the set of at least two temperatures, wherein the one or more subject camera functions are at least one of: a focal length function, a distortion tuning function, an alignment adjustment function, an imaging quality function, an optical distortion function, and an optical zoom function.

23. The subject camera of claim 22, wherein tuning the subject camera comprises:
digitally remapping the subject camera based on the one or more subject camera functions and the operating temperature.

24. The subject camera of claim 23, further comprising:
control circuitry configured to repeat the measurement of the temperature of the subject camera and tuning steps during operation of the subject camera;
wherein the digitally remapping step is based on the temperature and a sliding average of temperatures measured in prior iterations of the measuring the temperature of the subject camera step.

25. The subject camera of claim 22, wherein:
the subject camera is configured to repeat the measuring of the subject camera and tuning steps upon a command input to the subject camera.

26. The subject camera of claim 22, wherein:
the subject camera is configured to repeat the measuring of the subject camera and tuning steps when the internal temperature sensor indicates a change to the operating temperature.

27. The subject camera of claim 22, wherein:
the subject camera and the reference camera are different physical instantiations of a camera design.

28. The subject camera of claim 22, wherein:
the subject camera measurement data includes a temperature of the subject camera when the subject camera is turned on and a second temperature of the subject camera when the subject camera has warmed up.

* * * * *